Dec. 29, 1936. J. SCHMIDT 2,065,752
FOOD TREATING APPARATUS
Filed Sept. 30, 1932 6 Sheets-Sheet 1
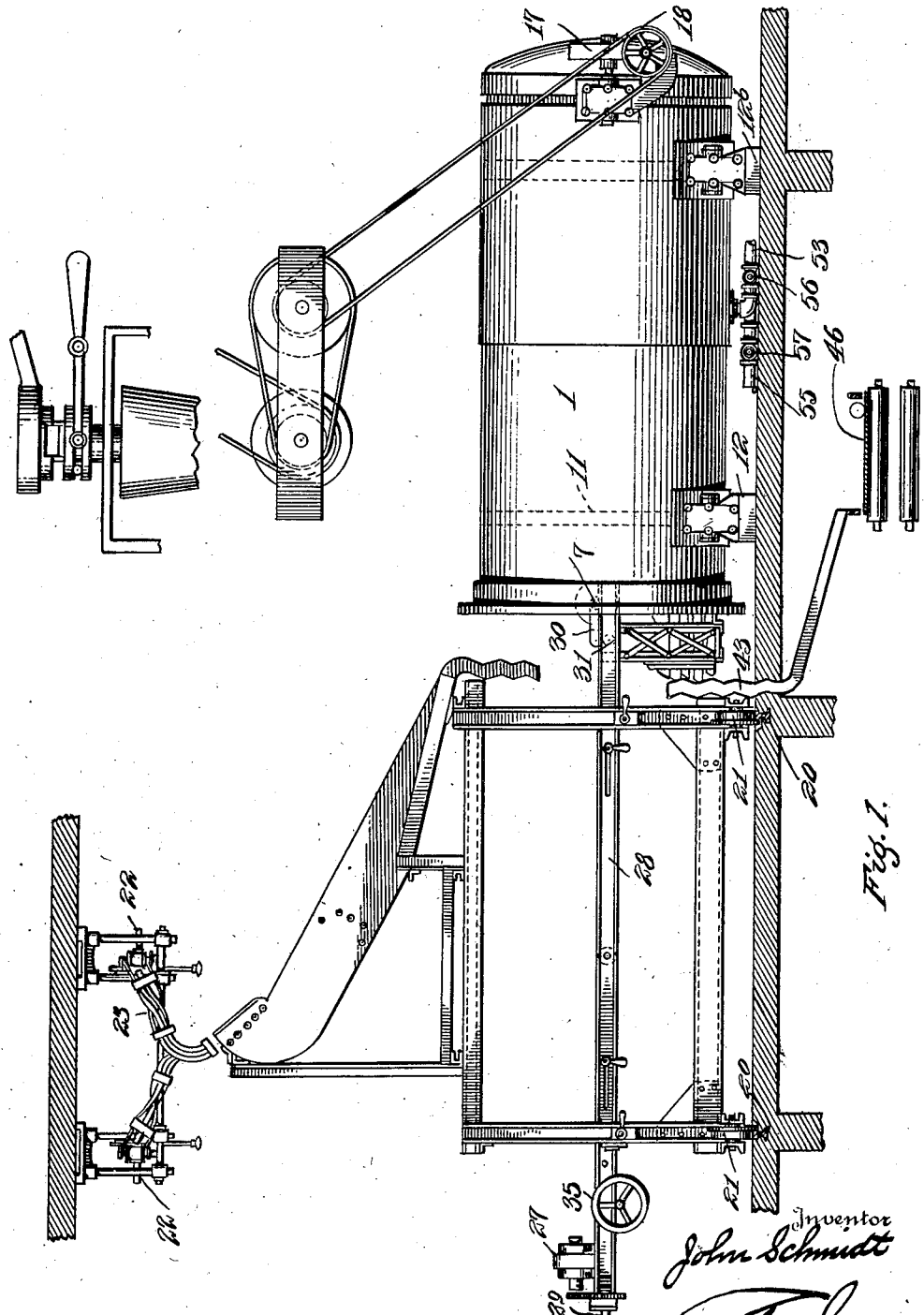

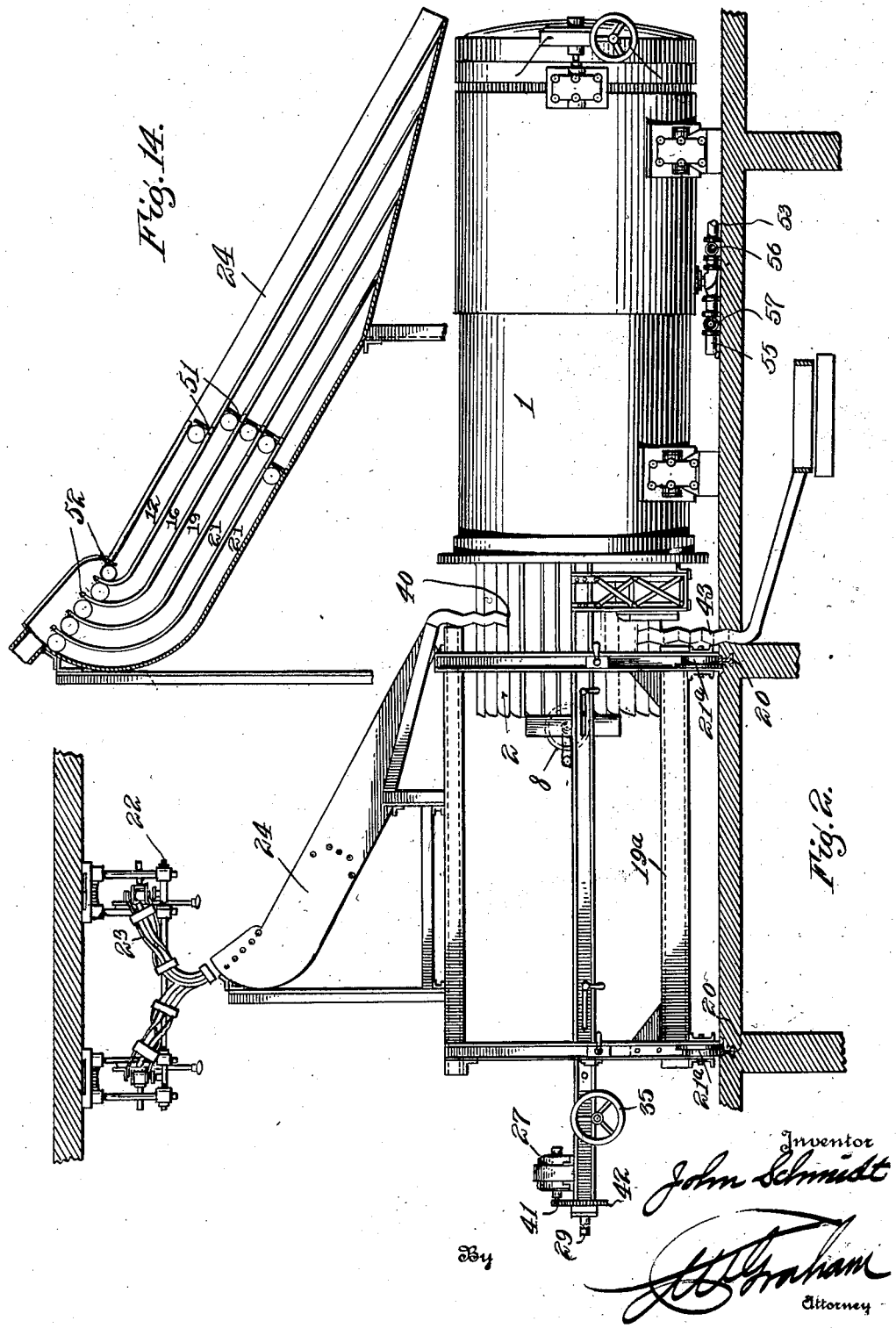

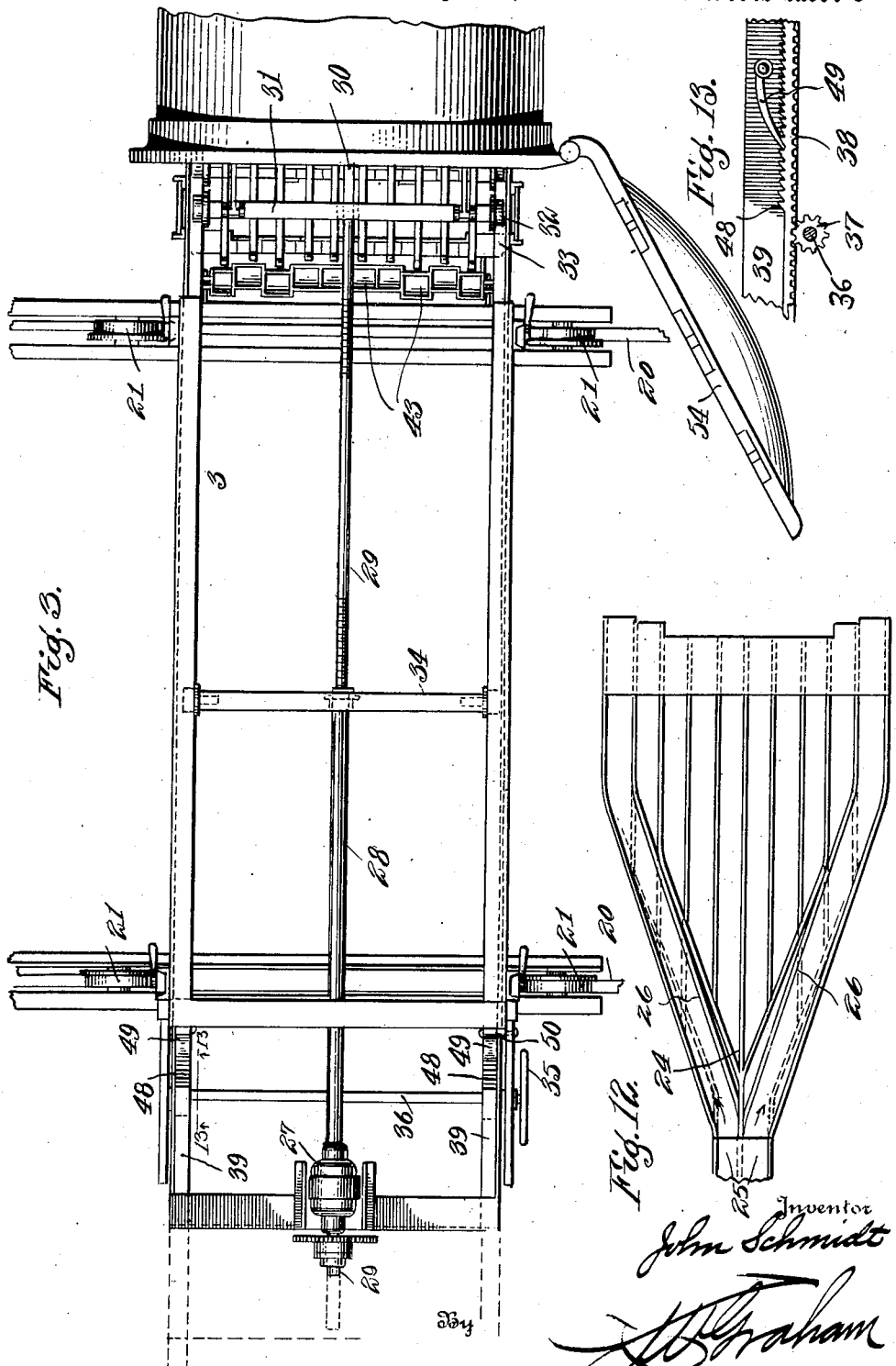

Dec. 29, 1936.  J. SCHMIDT  2,065,752
FOOD TREATING APPARATUS
Filed Sept. 30, 1932  6 Sheets-Sheet 4
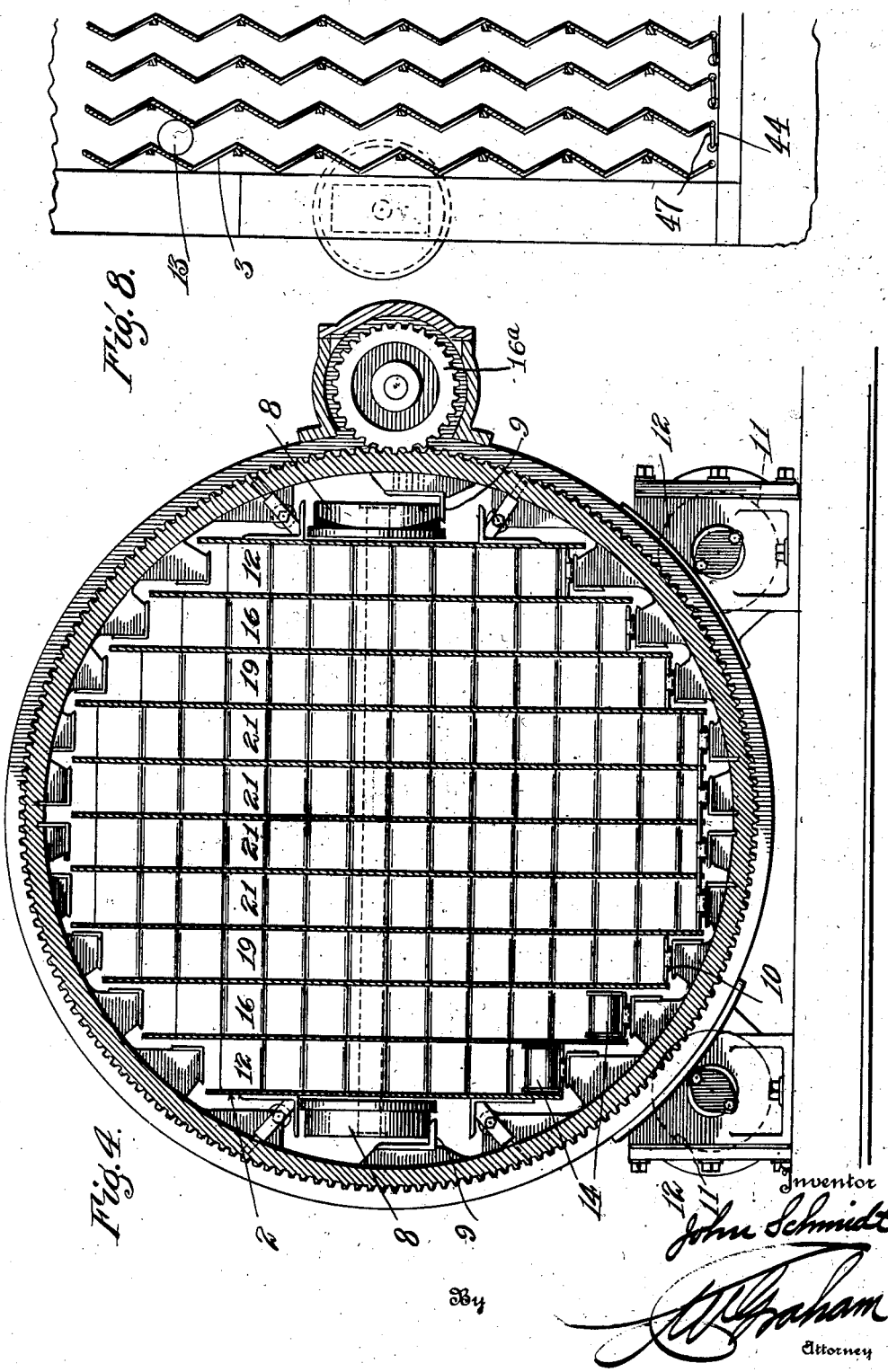

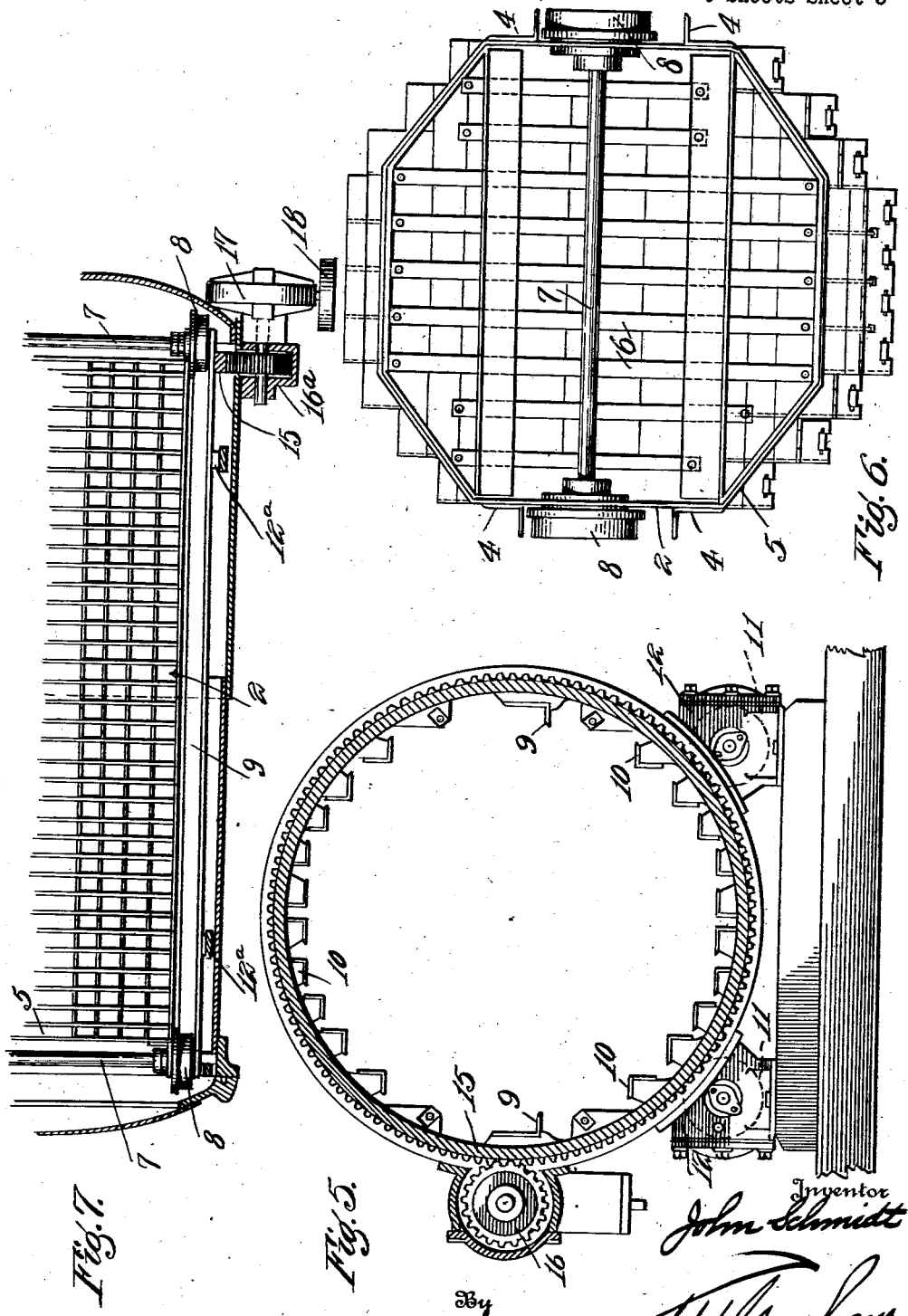

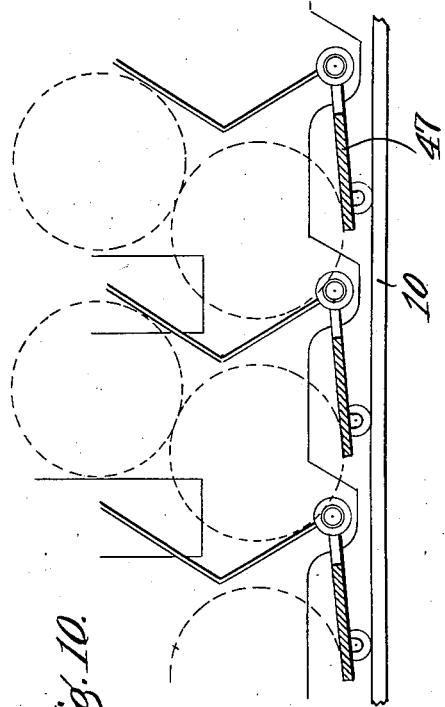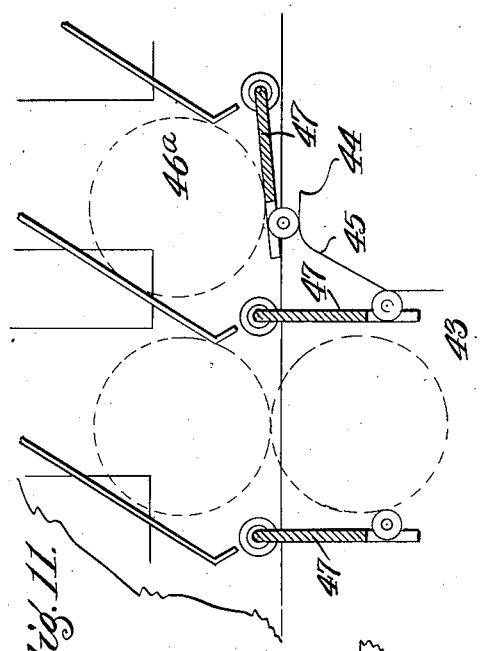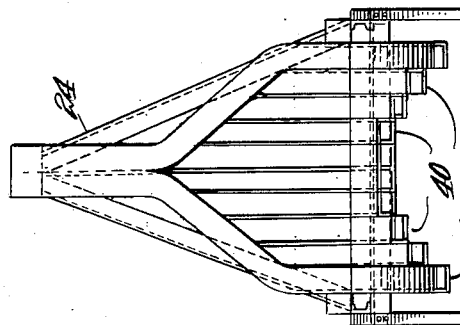

Patented Dec. 29, 1936

2,065,752

UNITED STATES PATENT OFFICE 2,065,752

FOOD TREATING APPARATUS

)hn Schmidt, Buffalo, N. Y., assignor to Food Machinery Corporation, San Jose, Calif., a corporation of Delaware Application September 30, 1932, Serial No. 635,678

21 Claims. (Cl. 214—17)

This invention relates to an apparatus for processing or sterilizing food products or the like in sealed containers and is particularly adapted to handling in a most efficient manner the commercial tin cans when packed with the ordinary food products.

This apparatus is what I may term a "semiautomatic" device adapted to the handling of large quantities of product in the minimum time and for applying the sterilizing temperatures to large units of assembled product in intermittent sequence rather than in continuous operation as is quite prevalent at the present time, and from which certain advantages flow that are not present in other apparatus for handling this class of product.

In the continuous type of cooker or sterilizer the canned product is kept in motion continuously, either rolled or tumbled to pass it from one end of the apparatus to the other, and it happens that many of the foods canned today are much better by being handled without any rolling or agitation whatever, and that some require considerable agitation to get the best results. In most continuous types of sterilizers there is little choice as to agitation since the product must be kept moving continuously in order to keep it out of the way of oncoming product and no matter how it is moved there is some agitation, so that with product that is better sterilized without agitation it is of course obvious that it cannot be given the best kind of treatment in a continuous machine.

The apparatus disclosed in this application has been designed to give the efficient results obtained with the continuous type of machine where the cans roll around the periphery, or to be equally adapted to handle the product in a completely quiescent state with no movement whatever during the processing period.

Briefly the apparatus comprises a series of treating chambers which are nothing more than shells which may be made steam or water tight, arranged as a battery with their open ends substantially along a horizontal line so that a loading platform and suitably arranged chutes may pass from chamber to chamber to deposit a lot of cans into cages or baskets for treatment. Each chamber is provided with a cage and canways that almost completely fill the chamber so that the entire interior space of each chamber is processing space and is filled with cans. These cages are filled from the moving platform and filling chutes and are then automatically inserted into the chambers and the end doors of the chambers closed so the entire cage full of cans are fully enclosed and subject to the processing temperatures.

Means are provided for rotating the cages when charged with cans at any desired speed or the cages may be left standing idle during the processing period, or they may be rotated from a minimum to a maximum speed of rotation to suit any kind of product being handled, and thereby giving just the degree of agitation desired or no agitation at all.

By submitting groups of caged cans to the processing temperatures in units any desired time of processing can be practiced and the time changed in any degree at any time during the operating period, to suit any product or any sudden change of product that becomes necessary in large canneries putting up a variety of product where several different kinds of product come in during a day's operation, and further a variety of product can be handled at the same time by simply confining each product to individual processing chambers each of which may be handled independently to suit that particular product.

The loading platform is arranged to travel laterally past the battery of processing chambers and to be in constant contact with can delivery lines so that the constant stream of cans coming from the source of supply will be accumulated as fast as they come and be assembled in groups or units in the baskets for individual group treatment in each chamber.

Coupling means are provided on the laterally moving loading platform for quick attachment to each cage or basket in the cooking chambers, with power means carried by the platform to draw the cages out of the chambers and align the can runways for receiving the cans. The movement of the cages to receive the charge of cans is intermittent in that the cages are divided in horizontal tiers lying in vertical planes and a cage stands at rest while each tier of cans is being deposited, the intermittent aligning movement being repeated until the entire cage is filled.

The contact of the loading platform with the supply of cans is by means of suitable spaced switches along the can runs which when manipulated will divert the streams of cans into the positioned chutes of the platform, which in turn direct the cans into the tiers of the cages.

A battery of processing chambers in sufficient number might be provided so that after the first chamber is filled and sealed and the processing started the time for processing the product would be substantially the time required to empty and fill all of the other chambers in the battery so that when the last chamber was filled the operator could move the loading platform to the first chamber, unload the processed goods and reload the cage with a new batch of cans.

The unloading of the processed cans is substantially automatic, in that the lower ends of each vertical tier is supplied with trap doors that are released in certain positions of the cages which permits the processed cans to roll out by gravity.

It is a principal object of this invention to provide an apparatus for processing or sterilizing canned goods wherein the entire interior space of the apparatus is substantially filled with canned goods so that there is a minimum of lost space.

It is also an object of the invention to provide means whereby canned goods may be processed in groups or unit loads.

It is also an object of the invention to provide means for assembling groups of canned goods in cages so arranged that they all move into and out of the cages along predetermined paths.

It is also an object of the invention to provide means, movable in relation to processing chambers for loading the groups of cans into cages and to insert the loaded cages into processing chambers to be submitted to the processing operation while other cages and chambers are being emptied and refilled with cans.

It is also an object of the invention to provide means whereby the flow of cans into and out of the cages is retarded to prevent possible injury thereto by falling contact.

It is also an object of the invention to provide means for giving any desired degree of agitation to the canned goods during the processing operation, or to withhold it entirely and leave the cans at rest during the processing.

It is also an object of the invention to provide means whereby any desired temperature and time may be given to any groups of cans for processing.

It is also an object of the invention to provide means for delivering a stream of cans to a series of manually manipulative switches adapted to direct the stream to the several positions of a loading device serving a series of treating chambers.

It is also an object of the invention to provide a loading means that is adapted to serve a battery of processing chambers for loading and unloading cans therefrom.

It is also an object of the invention to provide a series of treating chambers arranged in battery formation and to provide a single movable loading and unloading device to serve each of said chambers.

It is also an object of the invention to provide a series of treating chambers arranged side by side, each having a cage or basket for holding a group of cans, and each cage being adapted to independent rotation at any desired speed.

It is also an object of the invention to provide means for assembling groups of cans into units comprising cages or baskets adapted to receive the cans in arranged order and to release them in the order received.

It is also an object of the invention to provide means for containing a unit group of cans with the cans in arranged order and in separated tiers.

It is also an object to provide means for automatically locking each tier of cans within the cage assembly until the cage has been withdrawn from the processing chamber a predetermined distance when the tiers of cans are released for discharge from the cage.

With such objects in view as well as other objects inherent in the invention, the novel structural peculiarities, novel organization of elements, and the separate and collective operations involved in carrying out the recited objects of the invention, which will be made the subject matter of claims hereto appended, it is to be understood that the several necessary elements and combinations constituting the same may be varied in their proportions, placement, general arrangement and operative relation without departing from the nature and scope of the invention, and in carrying out the objects of the invention in a concrete form or machine, further objects, advantages and improvements have been evolved than have been enumerated, and in order to make the invention more clearly understood there are shown in the accompanying drawings, in a more or less diagrammatic manner, means and mechanism embodying the preferred structural arrangement and disposition of the different parts and combinations, but I have only illustrated one way of embodying the creative part or concept of the invention.

The described devices are embodiments of the invention which other structures might also employ and some of the parts and combinations may be used without the others in different types of such machines, without departure from the purview of the invention, I therefore regard myself as entitled to such variations and changes from the shown devices as fall within the scope and meaning of the claims.

The drawings accompanying this application may not necessarily be made to an exact scale, some parts may be more or less exaggerated in size and placement to better illustrate their form or operation, and the general design may not necessarily folow the best engineering practices in the construction of apparatus of this type, so with this understanding of the showing of the drawings they may now be referred to for a better understanding of the invention.

Figure 1 is a side elevation of an apparatus embodying the invention with the loading platform positioned in front of one of the processing chambers preparatory to withdrawing the cage in which the tiers of cans are deposited for processing when placed in the chamber.

Figure 2 is a similar view to Fig. 1 but with the cage being filled with cans. In the position of the cage shown it is nearly filled and is being moved intermittently back into the chamber as fast as a tier is completed.

Figure 3 is a plan of Fig. 2.

Figure 4 is an enlarged end elevation of one of the processing chambers showing a cage fully inserted in the chamber and disclosing a number of details.

Fig. 5 is a cross section of a processing chamber and shows clearly the trackways on which the cage rides and is confined during the processing operation.

Figure 6 is an end elevation of a cage separated from the processing chamber disclosing the details of structure.

Figure 7 is a partial sectional plan showing a cage fully enclosed in a processing chamber.

Figure 8 is a vertical side sectional elevation of a portion of a cage to show the zig zag construction of the can ways to act as a retardent means in loading to prevent damage to the cans falling on each other.

Figure 9 is a face of the loading platform showing the can chutes for loading the cans into the cages and the discharge chutes for directing the cans out of the cages when unloading.

Figure 10 is an enlarged detail of the automatically operated trap doors in the lower ends of the can ways for permitting escape of the processed cans when unloading.

Figure 11 shows substantially the same view as Fig. 10 but wherein the cage has been moved out a little farther so that the trap doors are released and swing open so the cans can escape.

Figure 12 is a plan of the can distributing chute for receiving the cans from the conveying lines and distributing them in substantial uniformity to the different channels in the cages.

Figure 13 is a detail of the rack mechanism for moving the loading connection up to the can carriers.

Figure 14 is a detail of the segregating chute for segregating the groups of cans to enter the several can ways of the can carriers.

The numeral 1 represents a treating or sterilizing chamber that is mounted in a fixed position and 2 represents a cage having a plurality of zig-zag canways arranged for vertical movement of the cans during loading and unloading. The zig-zag ways 3 are best shown in Fig. 8, and are made in this manner to retard the fall of the cans so they will not be damaged from falling on each other or when falling the entire length of a canway during the beginning of loading.

The cage or basket 2 is made up of bars, angles and sheet metal as is clearly shown in Fig. 6 which shows an end view, and as in Fig. 7 which shows a partial plan view. The side angles 4 and the end frame members 5 form a skeleton framework which carries the case parts and substantially holds them into the unit construction shown. Cross bars 6 are provided to give additional rigidity and stiffness to the structure.

Across each end of the cage is a shaft 7 carrying the flanged rollers 8 which form the supporting means for the cage in the chamber 1.

Fig. 5 shows the chamber in end view with the cage removed and clearly shows the trackways 9 on which the rollers 8 ride during movement of the cage in and out of the chamber. In Fig. 7 the cage is shown completely enclosed in the chamber and the rollers 8 are seen resting on the trackways 9.

The cage supporting device inside the chamber comprises the trackways 9 extending longitudinally and acting also as binding means for holding the supporting element in proper longitudinal adjustment, in addition to the angles 9 there are additional longitudinally extending angles 10 which help to bind the elements into a supporting unit.

Since the chamber 1 is stationary the cage supporting unit is arranged for rotary movement inside the chamber.

The cage supporting unit rests on suitably placed rollers 11 carried in the housings 12b. The rings 12a secured to the outer periphery of the supporting member act as annular trackways surrounding the member. See Figs. 5 and 7.

The central portion of the cage is made up of the plurality of zig-zag canways 3, Fig. 8, as seen from either the right or left of Fig. 4, and the same canways seen from a right angle appear in Fig. 4.

In Fig. 8 only one can 13 is shown but when the cage is filled the zig-zag canways are completely full of cans. In Fig. 4 two cans 14 are shown and if the canways were filled cans would be seen throughout the vertical spaces stacked one on top of the other.

Referring to Figs. 5 and 7, a ring gear 15 is attached at the inner end of the cage supporting structure. This ring gear and the bearing rings 12a serve to secure and align the various angles 9 and 10 comprising the cage supporting member. The ring gear 15 meshes with a pinion 16a carried by a housing secured to the chamber 1 and is connected by shaft 7 to a worm gear drive in the housing 17 which worm gear is driven by the pulley 18 and the belt running thereon.

Mention has been made of driving the cage within the chamber at variable rotary speeds. This may be accomplished by the use of any well known variable speed transmission and for the purpose of illustration there is shown in Fig. 1, the well known Reeves variable speed transmission which may be clutch driven or by tight and loose pulleys from the power source.

Either clutch or tight and loose pulleys driving the Reeves variable speed transmission will enable any speed to be obtained or permit entire stoppage of the transmission where no movement of the cage with loaded cans is desired during the processing period.

In order to load the cage with cans a loading platform 19a is provided which is a skeletonized structure supported on trackways 20 by means of the flanged wheels 21a. The trackways 20 may extend across the floor in front of a battery of the treating chambers to facilitate loading each of the individual cages with cans. The loading platform carries as an upper structure a series of can chutes adapted to contact with can conveyor lines 22, having switching and can directing means 23, which turn the cans from a vertical position as carried by the conveyors 22 to a horizontal position so they will roll through the distributing chutes 24.

By reference to Fig. 4 it will be seen that in the structure adopted to illustrate the invention, there are ten vertical tiers of canways, so that it is necessary to have ten feeding chutes to accommodate all of the canways at once. Fig. 12 shows as well as any of the views the arrangement of the can chutes for receiving cans from the conveyors 22 and distributing them to the several vertical canways in the cages. Cans being discharged from the two conveyors 22 will release the oncoming cans in pairs which will drop in the upper ends of the chutes as at 25, which will divide the stream of cans into the outside distributing runways 26, and since the ten canways feeding the ten vertical ways in the cage all pass up under the side chutes 26 cans will drop from these distributing chutes into the various other chutes and roll down into the vertical ways in the cage until the ten tiers in the cage are filled.

Before going on with a further description of the loading operation we should describe the manner of manipulating the cage and positioning it for the loading operation.

Figure 6 shows a full end view of the cage as removed from the shell 1, and Figure 4 shows an end with the cage positioned in the shell. Figures 2 and 3 show the end of the cage partly protruding out of the shell 1. The cage is made up of angle iron and bars so secured together to form a complete movable unit for holding the batch of cans. Figure 7 shows two cross shafts 7 carrying supporting rollers 8 which have been described.

It has been explained that the chambers or shells 1 may be arranged as a battery and that tracks 20 are placed along the front of the battery of treating chambers on which the loading platform 19 is traversed from chamber to chamber to load the cans in the cages.

After a batch of cans have received the desired treatment and are ready to be removed from the chamber 1, the loading platform 19 is moved into position in front of the chamber 1, after the door of the chamber has been opened and swung out of the way. The loading platform carries a power device for drawing the cage full of cans out of the shell 1, and comprises a motor 27, Fig. 3, direct connected to a sleeve 28 having an internal thread carrying the screw 29. The forward end of the screw 29 has a detachable connection with the front end of the can cage by means of the latch 30 hooking over the front shaft 7 and which is pivotally connected to a pony shaft 31 which has rollers 32 riding on the trackways 33 forming a part of the loading platform.

The loading platform is not movable axially relative to the treating chambers so that some means must be provided for moving the screw 29 and connections axially to make and unmake the connection with the can cages.

The screw 29 and sleeve 28 are mounted for reciprocation relative to the loading platform by being mounted on the pony shafts 31 and 34 and are given reciprocation by means of the hand wheel 35 mounted on the rack shaft 36 carrying pinions 37 meshing with a rack 38 secured on the under sides of the side bars 39. This hand operated device provides the means for positioning the latch into engaging relation with the shaft 7 to draw the can cage from the treating shell 1, and for drawing the screw and attachments away from the can cage after it is positioned in the chamber for treatment. The axial movement of these parts need be only sufficient to clear the fronts of the chambers when the loading platform is moved to another chamber.

Besides the screw mechanism to be moved back out of the way of the fronts of the treating chambers when the loading platform is moved from place to place the track rails 33 must also be moved toward and away from the front of the treating chamber. They must be moved up to align with the tracks 9 so that the rollers 8 will have support when the can cage is drawn from the treating shell 1.

The movement of the tracks 33 is accomplished after the screw 29 and sleeve 28 have been withdrawn by means of the same hand wheel 35 and rack 38 by simply locking the sleeve 28 with the dog 49 dropped into a ratchet on the top of the sleeve. Now by turning the hand wheel 35 the entire frame work carrying the motor and the track rails 33 will be moved backward away from the front of the treating chamber. When these parts have been moved back away from the treating chamber the loading platform may be moved laterally across the battery of chambers and positioned in front of any desired chamber.

There are a number of other structural details that have not been described but it is believed they will be better understood in an operative description which will now follow.

*Operation*

Cans filled with food or other products are delivered to the processing or treating room by means of overhead runways stretched along the ceiling of the room, and in the arrangement for supplying this apparatus with cans a number of switches are placed in the runways to divert the cans therefrom into the distributing chutes as shown in plan in Fig. 12 and side elevation in Figs. 1, 2, and in end elevation in Fig. 9.

As the cans roll into the chute of Fig. 12 as at 25 they will be somewhat uniformly distributed to the various chutes leading therefrom and will be carried to the ends of these chutes as at 40, Fig. 9. When the loading platform which carries these distributing chutes is positioned to load a can cage with cans the ends 40 of these distributing chutes are positioned over, and aligned with the top opening of a tier of canways 3 into which the cans roll and fill as they emerge from the ends of the chutes 40. In the drawings there are ten of the can tiers but there may be any desired number supplied in the construction of the device. The cans are directed to a tier of canways until all of the canways are filled when the can cage is moved the distance of one canway to the next and the operation is repeated.

If the operation is started with all chambers 1 empty then the first cage is completely withdrawn from the chamber 1 until the last tier of canways is positioned under the chutes 40. When this tier of canways is filled the cage will be moved back into the chamber until the next canway is positioned under the chutes 40, and this operation is repeated until all of the tiers of canways are filled when the loading platform will be disconnected from the cage and moved away to another chamber where the operation will be repeated, and the chamber just filled will be closed and the batch of cans treated, the treating continuing until completed and for such a time as is necessary for the product being handled.

Where a chamber is full of cans and the treatment has been completed and it is desired to remove the treated cans and refill the cage with untreated cans the operation would be as follows:

The loading platform would be properly positioned in front of the chamber after the door was swung out of the way, and the latch 30 hooked over the front shaft 7 and the cage withdrawn by means of the motor 27 rotating the sleeve 28 through the medium of the pinion 41 on the end of the motor shaft meshing with the gear 42 secured to the sleeve 28 which will draw the screw 29 through the sleeve 28 and thereby draw the cage out of the chamber.

The under side of each tier of canways in the cage has a trap door 43, seen best in Figs. 10 and 11, the free end of which rides on the cam rails 44 and is held in its up position closing the openings in the canways so the can may not escape during the treatment and in moving the cage in and out. At a certain point however, it is desired to discharge the cans as the cage is withdrawn, and to accomplish this in an automatic manner there is arranged adjacent the opening of each chamber a series of chutes 43 stepped to align with the openings of the canway tiers 3, and as the can cage is withdrawn from the chamber the first canway tier is aligned over the chutes 43 and just as the canways approach alignment the trap doors in this can tier drop open by rolling down over the cam track at 45, and the cans immediately roll down from the can tiers into the chutes 43 and pass onto the conveyor belt 46, Fig. 1, which conveys them to a place of storage or other place of disposal. As soon as a tier is emptied the cage is withdrawn until the next tier aligns with the chutes 43 when it is emptied in the same manner and this proceeding is repeated until the cage is completely emptied.

When the can tiers have all been emptied the cage will be completely out of the chamber and the loading may now be commenced. By reference to Fig. 2 it will be observed that the ends 40 of the delivery chutes are spaced just one tier inside of the chutes 43 so that the tier under the chutes 40 will have its lower ends closed by reason of the trap door being held in a closed position by resting on the cam track at 44 Fig. 11, the can tier being 46a. Each time the can cage is moved back one tier space the trap door 47 will ride up on the cam track 44 and thereby close that can tier and keep it closed until the cage is again withdrawn for discharging the cans. This step by step movement is repeated until the entire cage is filled when the loading platform will be removed to another position, the chamber door closed and the batch of cans treated.

The angle bars 10 are an extension of the cams 44 and act to hold the trap doors 47 in closed positions while the cages are in the retorts.

By referring to Fig. 13 it will be observed that the side frame bars 39 have a ratchet 48 which is engaged by a pawl 49 pivoted to the frame at 50, Fig. 3. This pawl and ratchet tend to hold and maintain the longitudinally movable mechanism that connects with the cages to draw them in and out of the retorts, in a retracted position while the loading platform is moved from retort to retort.

In Fig. 14 is shown an enlarged view of the loading chutes with one of the sides removed to show the hand operated switches 51 that hold the line of cans against movement after the cages are filled and while moving the platform from retort to retort. These switches extend laterally across the can chutes and block the movement of cans therealong when they are set in the positions shown in this figure.

Referring further to the loading chute of Fig. 14 it will be observed that the chutes are numbered 12, 16, 19, 21 and 21. These numbers represent the number of cans contained in the vertical zig zag can ways of the cage. By reference to Fig. 4 these numbers are repeated showing that the side ways each hold a column of 12 cans, the next adjacent can ways hold each 16 cans, the next adjacent can ways each hold 19 cans and the four central can ways each hold 21 cans.

The positioning of the hand manipulated switches 51 and 52 of Fig. 14 are so located that just the number of cans indicated by the numbers in each runway will be contained between the switches. This constitutes a segregating device for automatically counting the right number of cans for each zig zag can way in the cage. The switches 52 are opened for the flow of cans at the beginning of a segregation and the chutes will fill to the switches 51 which will be closed, then closing the switches 52 to shut off the further flow of cans and opening the switches 51 the segregated cans will flow to the various zig zag can ways and fill them completely because just the right number for each can way has been separated and isolated from the main supply.

Treating medium may be supplied to the chambers 1 by means of the pipe 53, which may be either hot water or steam, and since the chambers may be tightly closed against atmosphere by means of the door 54 pressure may be applied to give pressure treatment. After the charge of cans has been treated the treating medium may be drawn off through the pipe 55, hand valves 56 and 57 being manipulated according to the desired action.

What I claim as new and desire to secure by Letters Patent is:

1. An apparatus for marshalling and loading canned goods into retorts or sterilizing chambers comprising a battery of chambers, a trackway leading laterally across the open ends of said chambers, a loading device supported by said trackway and adapted to be moved therealong from chamber to chamber, a removable canned goods cage in each chamber, means of engagement between the said loading device and each of said cages, power means carried by said loading device to withdraw said cages from said chambers, can marshalling and delivering means carried by said loading device to direct the can goods into said cages while they are withdrawn from said chambers, said power means also acting to replace said cages in said chambers as the said canned goods are being loaded therein.

2. An apparatus for marshalling and loading canned goods into retorts or sterilizing chambers comprising a battery of chambers, a trackway leading laterally across the open ends of said chambers, a loading device supported by said trackway and adapted to be moved therealong from chamber to chamber, a removable canned goods cage in each chamber, a coupling device carried by said loading device to engage each cage and withdraw it from the chamber, power means for operating said cage engaging means, can marshalling and delivering means carried by said loading means to direct the canned goods into said cages, vertically disposed canways in said cages for the reception of the delivered cans and means for closing the bottoms of said canways when cans are delivered thereto, said power means acting to move said cages into said chambers as the canways in the cages are filled with cans.

3. An apparatus for marshalling and loading canned goods into retorts or sterilizing chambers comprising a battery of chambers arranged in a horizontal plane with their open ends on a line, a trackway leading laterally across the said open ends of the chambers, a loading device supported by said trackway and movable therealong from chamber to chamber, a removable canned goods cage in each chamber, means on said loading device for engaging each cage when aligned therewith, means for manipulating said engaging means to withdraw the cage from the chamber, a series of vertically disposed canways in said cage for the reception of tiers of canned goods, can marshalling and delivering means carried by said loading device for successively aligning with said vertically disposed canways and delivering tiers of cans thereto, means for imparting step movement to said can cages to successively bring said tiers of canways into alignment with the can delivering means and means for closing the bottom of each canway just before cans are delivered thereto.

4. An apparatus for marshalling and loading canned goods into retorts or sterilizing chambers comprising a battery of chambers arranged in a horizontal plane with their open ends in alignment, a trackway leading laterally across the open ends of said chambers, a loading device supported by said trackway and movable therealong from chamber to chamber, means carried by said loading device to engage with each cage when aligned therewith and power means for withdrawing said cage from the chamber, vertically disposed canways in said cage that are exposed for the reception of cans when said cage is removed from its chamber, can marshalling and delivery means carried by said loading device, the delivery chutes being in a fixed relation with the ends of the said chambers, means for imparting step by step movement to the said cages to bring the vertically disposed canways into alignment in succession, with the can delivery chutes, means for releasing groups of cans each to just fill the said vertical canways and means for closing the bottom of each canway just before delivering cans thereto.

5. An apparatus for marshalling and loading canned goods into retorts or sterilizers comprising a battery of sterilizing chambers arranged with their open ends in alignment, a trackway leading laterally across the said open ends of the chambers, a loading device mounted on said trackway and movable therealong from chamber to chamber, a removable canned goods cage in each of said chambers, means for connecting said cages to the said loading device when they are placed in alignment, means for withdrawing a cage from a chamber and means on said loading device to support said cage when withdrawn from its chamber, a series of vertically disposed canways in each cage, a marshalling and delivery means carried by said loading device to marshal and deliver groups of canned goods to the vertical canways in a cage, segregating means on said loading device to segregate groups of canned goods in proper number to just fill the said vertical canways and means for closing the bottoms of said vertical canways just before delivering cans thereto.

6. An apparatus for marshalling and loading canned goods into retorts or sterilizing chambers comprising a battery of sterilizing chambers arranged with their open ends in alignment, a trackway leading across the open ends of said chambers and movable therealong from chamber to chamber, a removable canned goods cage in each chamber, means for connecting said cages to said loading device when they are in proper alignment, power means for withdrawing a connected cage from a chamber and means for supporting said cage when so withdrawn, vertical canways in each cage for the reception of groups of cans, marshalling and delivery means on said loading device, segregating means for segregating groups of cans in proper number to just fill the said vertical canways, said power means giving a step movement to said cage to successively align the vertical canways with the delivery means and means for releasing the segregated groups of cans so they may pass into the said vertical canways with means for closing the bottoms of said vertical canways just before cans are deposited therein.

7. An apparatus for loading canned goods into sterilizing chambers comprising a plurality of sterilizing chambers, a trackway lying laterally across the open ends of said chambers, a loading device movable along said trackway, a can cage in each of said chambers, a trackway in each of said chambers for supporting said cages when therein, a trackway on said loading device for supporting said cages when withdrawn from said chambers, a coupling device for connecting said cages with said loading device, means on said loading device for withdrawing the cages from the chambers and positioning them on said loading device, means on said loading device for arranging cans in groups and means for releasing said groups so they may pass into said cages and means for giving said cages a step movement so pluralities of groups of cans may be deposited therein as said cages are returned to said chambers.

8. An apparatus for loading canned goods into sterilizing chambers comprising a plurality of chambers arranged with their open ends in alignment, a trackway running across the front ends of said chambers, a loading device movable along said trackway from chamber to chamber, a can cage in each chamber, a trackway in each chamber to support the can cage when therein, a framework supporting said trackway, rollers on which said framework is mounted for rotation within said chamber, means for connecting the cages in succession with said loading device, means for withdrawing a connected cage from its chamber and positioning it on said loading device, vertical canways in each cage, can chutes on said loading device adapted to align with said vertical canways in the cage, means for delivering cans from said loading device into said vertical canways when they are aligned and means for giving a step by step movement to the can cages to successively align the vertical canways with the delivery chute.

9. An apparatus for loading canned goods into treating chambers comprising a loading device movable across the open ends of treating chambers, means on said loading device for segregating groups of cans and holding them in readiness for delivery, cages for holding a plurality of groups of cans, vertical canways in said cages permanently open at the top and having doors in the bottoms, means for aligning the vertical canways in the cages with delivery chutes on the loading device, means for releasing the assembled groups of cans so they may pass into the said aligned vertical canways, means for aligning the canways in succession with the loading chutes to receive charges of cans therefrom and means on said loading device for supporting a cage while loading cans in the vertical canways.

10. An apparatus for loading canned goods into treating chambers comprising a series of treating chambers, a loading device movable at will across the open ends of said chambers, can cages in each chamber and means for connecting a cage at will to said loading device to withdraw it from its chamber with means on the loading device to support the said cage when withdrawn, vertical canways in the cages, means on the loading device to segregate and hold groups of cans in readiness for delivery, means on said loading device for delivering cans into said vertical canways in said cages as the vertical canways are successively aligned with said delivery means, closures for the bottoms of the vertical canways to hold the groups of cans therein while in said treating chambers and means for opening said closures when the cages are withdrawn from the chambers to release the groups of cans from the vertical canways.

11. An apparatus for loading canned goods into treating chambers comprising a series of treating chambers arranged with their open ends along a straight front, a trackway running across the open ends of the aligned chambers, a loading device movable along said trackway to serve each of said chambers, can cages in each chamber for containing groups of canned goods in a regular order, means for connecting a can cage with said loading device and means on said loading device for drawing the can cage out of the chamber onto the loading device, can marshalling and segregating means on said loading device to segregate groups of cans for delivery to the can cage thereon, vertical canways in said cage arranged to align with the can delivery means on said loading device, means for releasing the groups of segregated cans so they may pass into the vertical canways aligned with the delivery means, imparting step movement to the can cage so that the vertical canways will be aligned with the can delivery means in succession until the entire can cage is filled with cans the step movement acting to gradually return the can cage to the treating chamber.

12. An apparatus for loading canned goods into treating chambers comprising a battery of treating chambers arranged with their open ends along a straight front, a trackway leading across the open ends of the treating chambers, a loading device movable along said trackway to serve each chamber, a can cage in each chamber having vertical canways for receiving groups of cans separated from each other, means for connecting a can cage with said loading device and power means on the loading device to draw the can cage out of the treating chamber and deposit it onto the said loading device, means on said loading device to segregate groups of cans and hold them ready for release into the vertical canways in the cage, the said power means on the loading device giving a step movement to said can cage to successively align the said vertical canways with the can delivery means and means for releasing groups of cans each time a group of vertical canways is aligned with the delivery means, and means for closing the bottom of each vertical canway just before cans are released to pass therein.

13. An apparatus for loading canned goods into treating chambers comprising a group of treating chambers arranged with their open ends along a predetermined line, a trackway running along the open ends of said chambers, a loading device movable along said trackway to serve said chambers, means carried by said loading device for segregating groups of canned goods and holding them for release, a can cage in each chamber for holding the segregated groups of cans and means for withdrawing and replacing each can cage to charge it with cans and to discharge treated cans, the can cages having vertical canways into which the segregated groups of cans are released successively and pass into the canways from the top and are discharged from the bottom after treatment.

14. An apparatus for loading canned goods into treating chambers comprising a loading device movable into alignment with a treating chamber, a can cage in said chamber for holding separated groups of cans, means on said loading device for segregating groups of cans and holding them for release, means for moving a can cage from a chamber and aligning it to receive the held groups of cans, vertical canways in said can cage for receiving the groups as released and means for imparting a step movement to the can cage to successively align it to receive successive groups of cans from said segregating means.

15. An apparatus for loading canned goods into treating chambers comprising a loading device movable into operative alignment with a chamber, a can cage in the chamber to hold separated groups of cans, vertical canways in said cage to contain the said groups of cans the tops of said canways being open and the bottoms having a removable closure, segregating means on said loading device to segregate groups of cans for release to said can cages and means to release the segregated groups whenever the vertical canways are aligned with said segregating means, the groups of cans passing down vertically into the canways for treating in the chambers and then passing down vertically when discharged from the cages the said bottom closures being opened successively as the cages are withdrawn from the chamber.

16. An apparatus for loading canned goods into treating chambers comprising a loading device movable into operative alignment with the open end of a treating chamber, a can cage in said chamber, means for connecting the said can cage to the loading device and means for withdrawing the can cage from the treating chamber and depositing it on the loading device, vertical canways in said can cage of differing can content, can segregating means on said loading device to segregate groups of cans, each group as segregated being just sufficient to fill a certain vertical canway in said cage, means for successively aligning said canways with said segregating means so that each group of segregated cans will pass to the vertical canway adapted to just contain that group.

17. An apparatus for loading canned goods into treating chambers comprising a loading device movable into operative alignment with the open end of a treating chamber, a can cage in said chamber, means for connecting said can cage with said loading device and means for removing the can cage from the chamber and depositing it on said loading device, vertical canways in said cage arranged in groups each group having the same can capacity but the canways in each group being of variable capacity, segregating means for segregating groups of cans, each group containing sufficient cans to just fill one group of the vertical canways, and each group having a variable number of cans to just match the variable capacity of the canways in each group.

18. An apparatus for loading canned goods into treating chambers comprising a loading device movable into operative alignment with a chamber, a can cage movable into and out of said chamber, vertical canways in said cage, means for segregating groups of cans associated with said loading device, means for successively aligning the said vertical canways with said segregating means and means for releasing segregated groups of cans into said canways, a movable closure for closing the bottoms of said canways as the cage is moved into the treating chamber and means for releasing the closures when the cage is withdrawn from the chamber to permit discharge of the treated cans.

19. An apparatus for loading canned goods into treating chambers comprising a loading device movable into operative alignment with a treating chamber, a can cage in said chamber, means for connecting said can cage to said loading device, a telescopic screw device and power means for withdrawing said cage from the treating chamber, when rotated in one direction and for replacing said cage in the chamber when rotated in the opposite direction, means associated with said loading device for filling cans in said cage during the period it is being replaced in said chamber.

20. An apparatus for loading canned goods into treating chambers comprising a loading device movable into operative relation with a treating chamber, a can cage in said chamber, means for connecting said can cage to said loading device, a screw member and power means for withdrawing said cage from said chamber and replacing the same therein, can delivery means associated with said loading device to supply cans to said can cage during its movement into said chamber and a trackway carried by said loading device to support said cage while it is being moved relative to said chamber.

21. An apparatus for loading canned goods into treating chambers comprising a loading device movable into operative relation with a treating chamber, a can cage in said chamber, hand operated means for positioning said loading device in juxtaposition to said can cage for removing said cage from the treating chamber, power means for then removing the said cage and means associated with said cage for releasing cans therefrom during its removal and means associated with said loading device for supplying cans to said cage during its return to said treating chamber.

JOHN SCHMIDT.